Sept. 19, 1967 P. H. GRIFFIN III 3,342,216
MUD THROTTLING VALVE
Filed Feb. 1, 1966 4 Sheets-Sheet 4

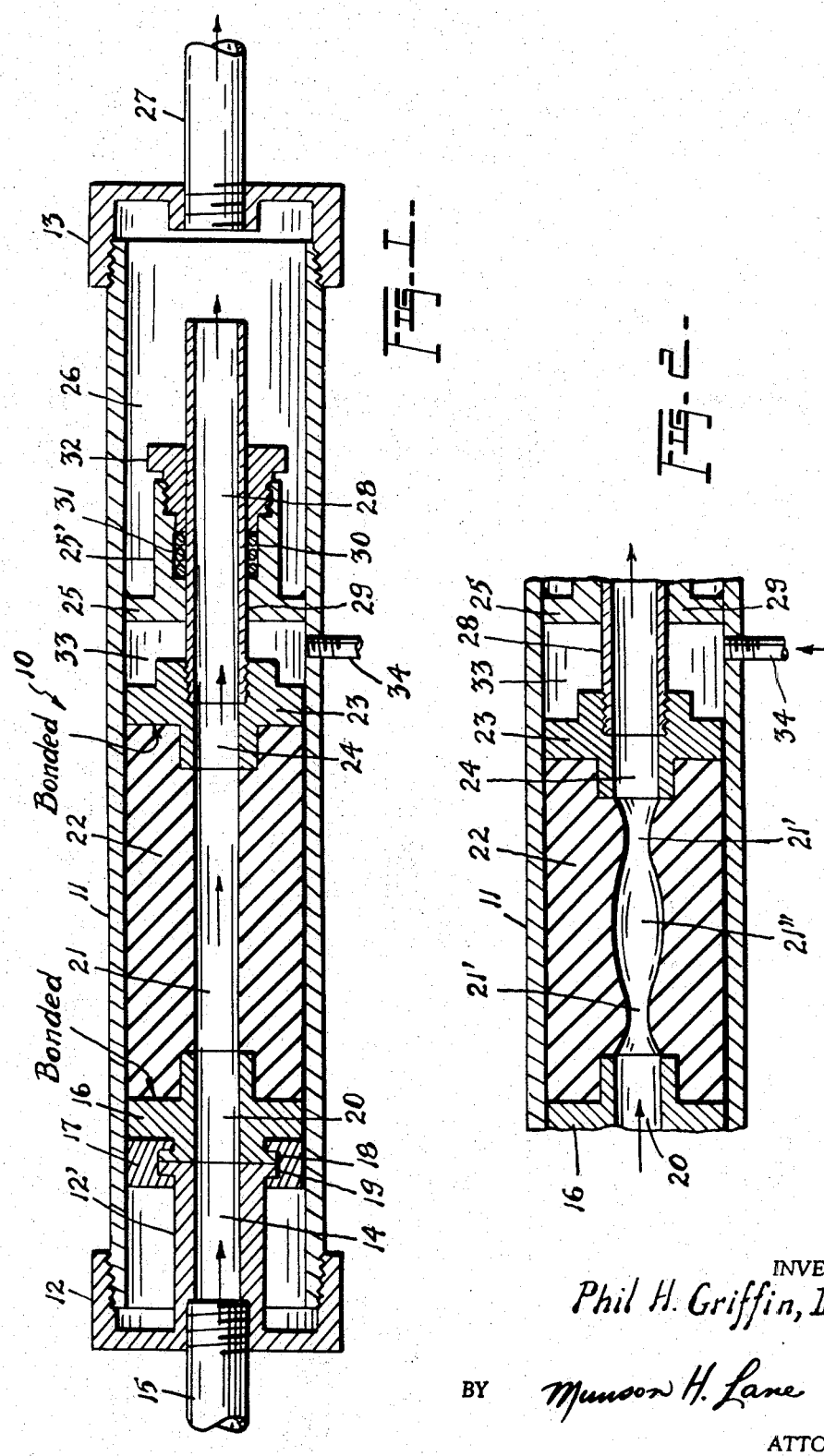

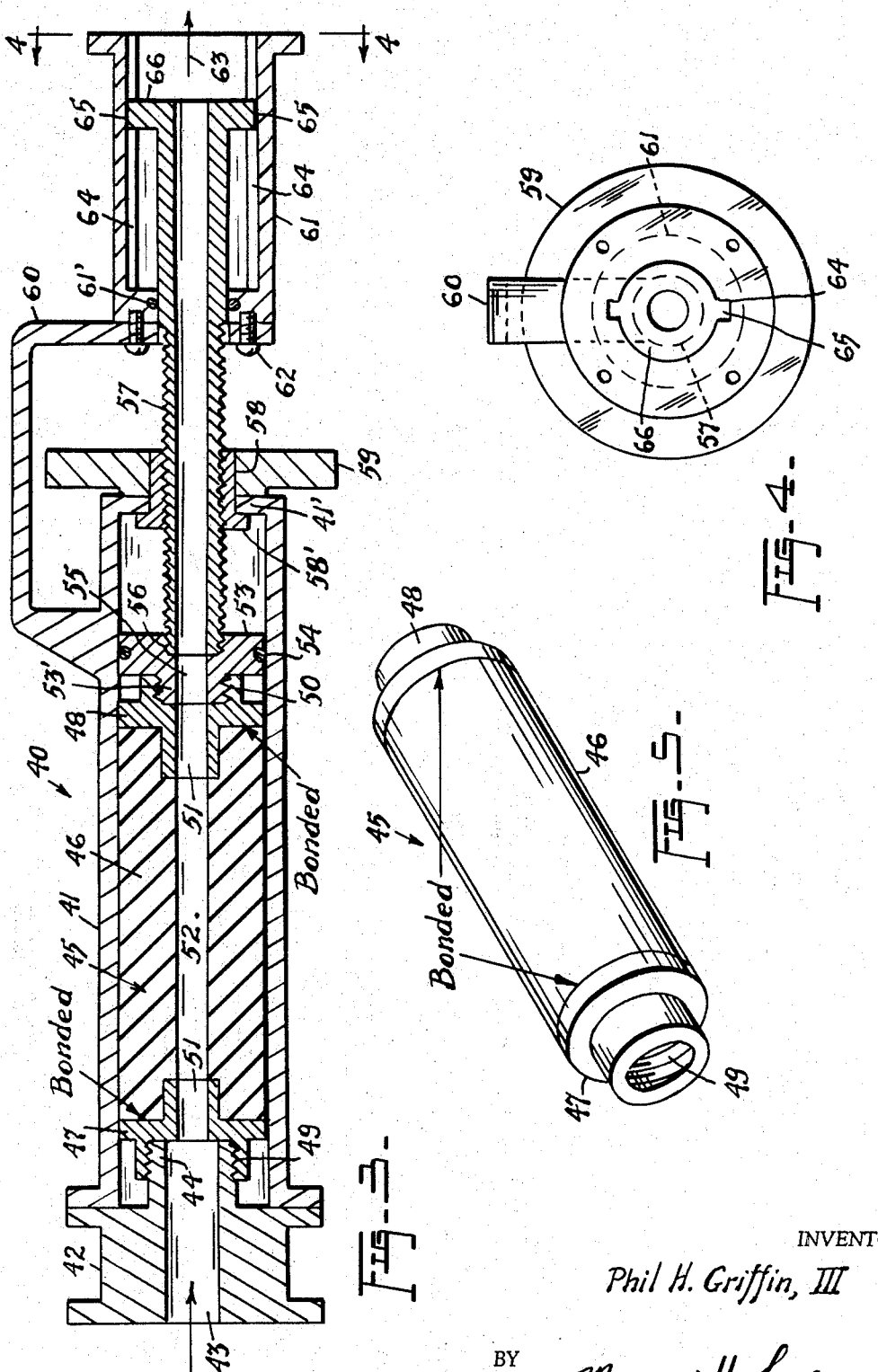

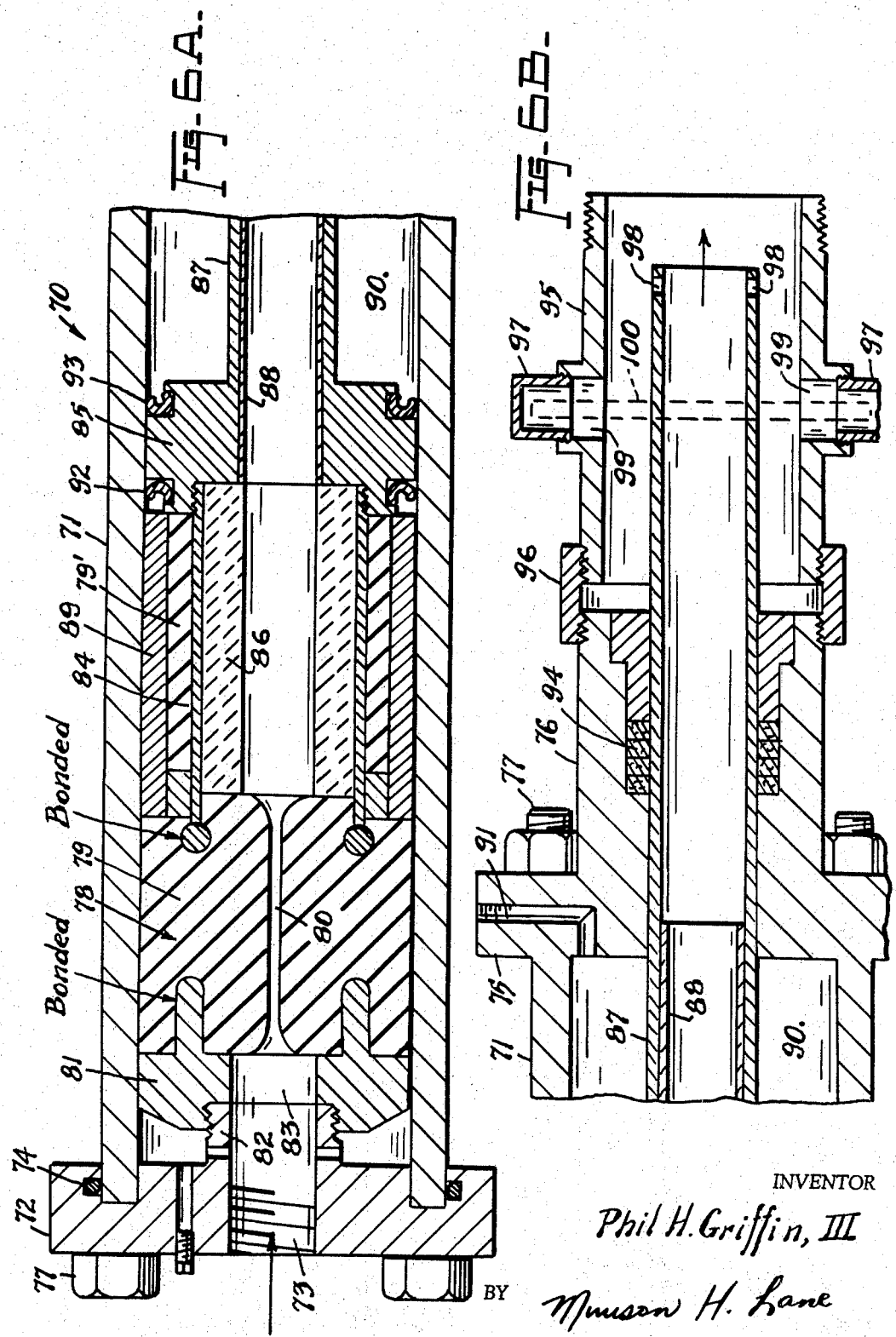

INVENTOR
Phil H. Griffin, III
BY Munson H. Lane
ATTORNEY

United States Patent Office 3,342,216
Patented Sept. 19, 1967

3,342,216
MUD THROTTLING VALVE
Phil H. Griffin III, Fort Worth, Tex., assignor to Bass
Brothers Enterprises, Inc., Fort Worth, Tex.
Filed Feb. 1, 1966, Ser. No. 524,061
11 Claims. (Cl. 138—45)

ABSTRACT OF THE DISCLOSURE

The present application discloses a fluid throttling valve comprising in combination, an elongated housing adapted for passage of fluid longitudinally therethrough and having an inlet and an outlet end, a fixed abutment member mounted in fixed position at the inlet end portion of said housing and provided with a central port, a tubular valve member of resilient material positioned in the housing and having the inlet end thereof secured to said fixed abutment member, said valve member being provided with a central fluid passage in communication with said port of the fixed abutment member, a slidable abutment member at the outlet end of said valve member and provided with a central port in register with said fluid passage of the valve member, said resilient valve member being axially compressible and radially inwardly expansible whereby the cross-section of said fluid passage may be reduced as a function of axial thrust applied to said slidable abutment member in the direction of the fixed abutment member for compressing the resilient valve member therethrough, and means for applying axial thrust to said slidable abutment member, together with a tubular liner of wear resistant material axially juxtaposed to said resilient valve member.

---

This application is a continuation-in-part of my co-pending application Ser. No. 453,663, filed May 6, 1965.

The aforementioned application discloses a valve such as may be effectively used to throttle the flow of mud from an oil well for creating a back pressure against the well. The valve utilizes a cylindrical valve member of resilient material which is provided with an axial fluid passage and is capable of being axially compressed and radially inwardly expanded so as to reduce the cross-section of the fluid passage and thereby provide the desired throttling action.

As in this and in the aforementioned application, the resilient valve member is equipped at the ends thereof with a pair of abutment members so that axial compression of the valve member may be properly effected. One of such abutment members is fixed in the housing of the valve while the other is slidable. The invention has, as one of its important features, an arrangement whereby the abutment members are securely bonded to the resilient valve member so that they are not subjected to motion by fluid pressure inside the valve. The present invention provides certain improvements in the valve structure, but also carries forward the aforementioned important feature which deals with the secure bonding of the abutment members to the resilient valve member.

In addition, while the aforementioned application discloses fluid actuated means for applying axial thrust to the resilient valve member, the present invention discloses a modified arrangement whereby such thrust may be applied by mechanical means rather than by fluid actuated means.

Further still, another important object of the present invention is to provide the valve structure with a wear resistant liner disposed adjacent to and downstream from the resilient valve member so as to protect critical components of the valve against abrasion and wear by the passage of fluid therethrough.

Other objects, features and advantages of the invention will be understood from the following description taken in conjunction with the accompanying drawings, wherein like characters of reference are employed to designate like parts, and wherein:

FIGURE 1 is a longitudinal sectional view showing one embodiment of the throttling valve in its fully open position;

FIGURE 2 is a fragmentary longitudinal sectional view thereof in a partially closed position;

FIGURE 3 is a longitudinal sectional view showing a modified form of the valve in its open position;

FIGURE 4 is an end view, taken in the direction of the arrows 4—4 in FIG. 3;

FIGURE 5 is a perspective view of the choker assembly used in the embodiment of FIGS. 3 and 4, including the resilient valve member and the abutment members bonded thereto;

FIGURE 6A is a fragmentary longitudinal sectional view showing the inlet end portion of another modified embodiment of the valve in its throttling position;

FIGURE 6B is a fragmentary longitudinal sectional view showing the outlet end portion of the valve embodiment of FIG. 6A;

Figure 7:
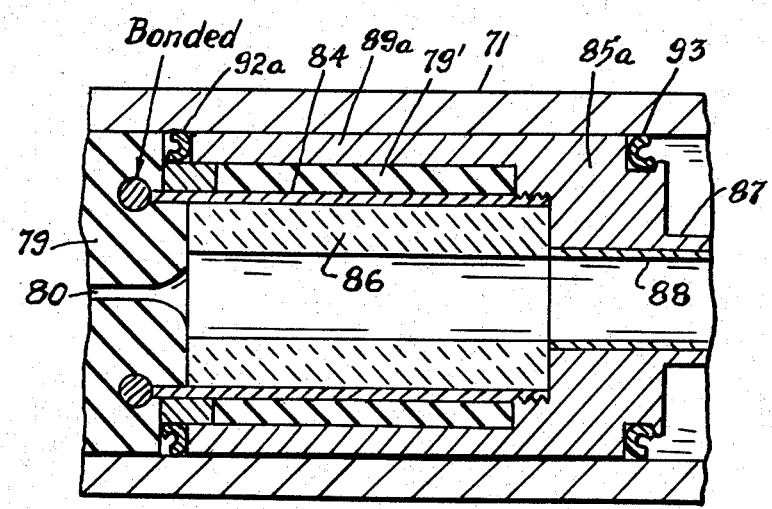
FIGURE 7 is a fragmentary longitudinal sectional view, similar to that in FIG. 6A, but showing a further modified embodiment.

Referring now to the accompanying drawings in detail, FIGS. 1 and 2 correspond to the disclosure in my aforementioned application Ser. No. 453,663 and show a mud throttling valve designated generally by the reference numeral 10. The same embodies in its construction a cylindrical housing 11 provided at its ends with screw-threaded, removable end caps 12 and 13. The cap 12, which is located at what may be called the inlet end of the housing, is formed integrally with a tubular extension 12', the latter projecting into the housing and defining an inlet 14 in communication with a mud inlet pipe 15 which leads to the valve directly from the well (not shown).

A fixed abutment member 16 is disposed at a fixed position in the housing adjacent the cap 12, being held therein by a suitable coupling ring 17 which encompasses annular shoulders 18, 19 provided, respectively, on the member 16 and extension 12' of the cap 12. The abutment member 16 is formed with a central port or passage 20 in register with the inlet 14 in the cap extension 12' and also in register with an axial passage 21 in a valve member 22 now to be described.

The valve member 22, cylindrical in shape, is formed from suitable resilient material such as rubber, neoprene, or the like, the outside diameter thereof conforming to the inside diameter of the housing 11 in which the member 22 is positioned with one of its ends in abutment with the abutment member 16. The other end of the member 22 abuts a second abutment member in the form of a piston 23 which is slidable in the housing 11 and has a central port 24 in register with the passage 21 of the valve member 22, as will be clearly apparent. The resiliency of the valve member 22 is such that when axial thrust is applied thereto by the piston 23 in the direction of the abutment member 16, the resilient valve member 22 is axially compressed and becomes radially inwardly expanded so as to reduce the cross-section of the passage 21, substantially as illustrated in FIG. 2. When application of such axial thrust is discontinued, the member 22 inherently resumes its initial form and the passage 21 is fully open, as shown in FIG. 1.

A partition 25 is secured, as by welding, for example, in the housing 11 in spaced relation from the piston 23 and from the outlet cap 13 of the housing. The partition 25 is provided with an integral, central boss 25', which projects into what may be called a fluid outlet chamber 26, existing in the housing between the partition 25 and the outlet end cap 13, it being noted that the cap 13 is equipped with a mud outlet pipe 27 through which the mud is recirculated to the mud pit, sump, or tank of the well (not shown), the pipe 27, of course, being in communication with the chamber 26.

A fluid transmitting tube 28 is secured in the port 24 of the piston 23 for sliding movement therewith, the tube 28 extending slidably through a bore 29 provided centrally in the paratition 25 and through a counterbore 30 provided in the boss 25' of the partition, so that the outer end of the tube 28 projects into and communicates with the aforementioned outlet chamber 26. Suitable packing glands 31 and a packing nut 32 are provided in the counterbore 30 to prevent leakage of fluid around the tube 28.

A portion of the housing 11 between the piston 23 and the partition 25 defines a pressure chamber 33 which surrounds the tube 28 but is out of communication with the interior of the tube. The chamber 33 is adapted to receive, as through a hose or pipe 34, fluid under pressure from a suitable hydraulic or pneumatic source (not shown), which is entirely independent of the fluid (mud) passing through the throttling valve.

It will be apparent that when hydraulic or pneumatic fluid under pressure is admitted through the line 34 into the pressure chamber 33, it will react between the relatively stationary partition 25 and the slidable piston 23, thus causing the piston to exert axial pressure or thrust on the resilient valve member 22 for inward radial expansion of the latter to reduce the cross-section of the passage 21 as already described. Possible leakage of the hydraulic or pnumatic fluid in the chamber 33 past the tube 28 will be prevented by the packing means 31, 32, so that such fluid does not become mixed in the chamber 26 with the fluid (mud) passing through the valve. At the same time, the sliding movement of the tube 28 through the partition 25, caused by sliding of the piston 23, is facilitated while maintaining communication between the interior of the tube 28 and the mud outlet chamber 26, as will be readily understood.

It is to be particularly noted that the abutment member 16 and preferably the piston 23 are securely bonded, as by vulcanizing, for example, to the ends of the resilient valve member 22. Since the abutment member 16 and the adjacent end portion of the member 22 bonded thereto are held in a fixed position by the means 12, 12' and 17, they are not subjected to motion by pressure inside the valve, either the hydraulic or pneumatic pressure in the chamber 33 or the pressure of flow from the well. Thus, all compression of the valve member 22 must arise as the result of hydraulic or pnuematic fluid pressure in the chamber 33 and the valve is what essentially may be called a "fail open valve."

In addition, it is contemplated that the valve member 22 initially be of a much greater length than necessary, so that the excess length will serve to provide a "reserve" which may be used to replace what is lost through erosion or abrasion. This will allow the valve to be utilized over a much greater period of time than would otherwise be possible if the valve member 22 initially were of just the adequate length.

The combination of the aforementioned "reserve" length of the valve member 22 and the bonding of the elements 16 and 23 thereto creates an unusual configuration in choking of the passage 21 when hydraulic or pneumatic fluid is admitted under pressure into the chamber 33. Such choking takes place at two longitudinally spaced regions 21' of the passage 21, with an enlarged region 21" between the two chokes, substantially as illustrated in FIG 2. This produced an effect of a "stage" choke, with each of the chokes having less pressure drop across it.

It will be also observed that the throttling valve is arranged axially to permit a straight-through flow of mud from one end of the valve to the other, thus eliminating wear and abrasion encountered in conventional valves wherein the flow is diverted.

Referring now to the modified embodiment of the throttling valve shown in FIGS. 3–5 and designated generally by the numeral 40, the same comprises a cylindrical housing 41 which has suitably secured to one end thereof a flange 42 provided with a mud inlet 43 and with an externally screw-threaded adapter 44 which projects into the housing 41 as shown. The choke assembly 45 is positioned in the housing 41 and comprises a cylindrical valve member 46 of resilient material, which has its ends securely bonded, as by vulcanizing, or the like, to a pair of abutment members 47, 48.

The abutment member 47 may be referred to as the fixed abutment member and is internally screw-threaded as at 49 to receive the aforementioned adapted 44, thus holding the abutment member 47 in a fixed position in the housing 41. The abutment member 48 is slidable in the housing and is internally screw-threaded as at 50. The abutment members 47, 48 are provided with ports 51 in register with the axial fluid passage 52 in the valve member 46, it being understood that when the abutment member 48 is slid in the direction of the member 47, the valve member 46 will be axially compressed and radially inwardly expanded to reduce the cross-section of the fluid passage 52.

The internal screw-threads 50 of the slidable abutment member receive a screw-threaded adapter portion 53' of a piston 53 which is slidable in the housing 41 and is provided with a suitable packing ring 54. The piston 53 is formed with a central port 55 in register with the port 51 of the abutment member 48 and is internally screw-threaded as at 56 to receive an externally screw-threaded fluid transmitting tube 57. The tube 57 projects outwardly from the housing 41 through an internally screw-threaded boss or nut 58 which is rotatably positioned in an aperture formed in the end wall 41' of the housing 41. The nut 58 is provided with a flange 58' at the inside of the end wall 41' and a suitable hand wheel 59 is secured to the nut at the outside of the end wall. The tube 57 is held against rotation by means hereinafter described, and it will be apparent that rotation of the aforementioned hand wheel 59 together with the nut 58 will cause the tube 57 to be moved axially relative to the housing 41. Thus, if the wheel 59 is turned in a direction to slide the tube 57 into the housing, the slidable abutment member 48 will axially compress the valve member 46 to effect the desired throttling action. Conversely, by turning the wheel 59 in the opposite direction, the valve will be opened. In this manner, mechanically actuated means are provided for controlling the valve 40, in place of the fluid actuated means provided in the valve 10.

The piston 53 may be omitted if desired, in which event the tube 58 may be screwed directly into the screw-threads 50 of the abutment member 48, instead of into the threads 56 of the piston.

The housing 41 is equipped with an offset arm 60 which clears the hand wheel 59 and carries a housing extension 61 coaxial with the housing 41, the extension 61 being secured to the arm 60 as by the bolts or screws 62. The fluid transmitting tube 57 extends into the housing extension 61 for outlet of fluid from the valve as at 63, a suitable sealing ring 61' being provided in the extension 61 around the tube. The housing extension 61 is provided at the inside thereof with a pair of longitudinal grooves 64 which slidably receive projecting lugs 65 on the end flange 66 of the of the tube 57, thus preventing the tube from rotating together with the nut 58 when the hand wheel 59 is turned.

While the flow of fluid through the valve 40 has been described as being from the inlet 43 to the outlet 63, the direction of flow may be reversed if desired, inasmuch as the positively acting mechanical actuator means 57, 58, 59 is capable of holding a desired choke size regardless of the direction of fluid flow.

Another modified embodiment of the valve is shown in FIGS. 6A and 6B and designated generally by the numeral 70. This embodiment is particularly designed to prolong useful life of the valve, particularly from the standpoint of affording protection against abrasion and wear by fluid passing therethrough.

The valve 70 comprises a tubular housing 71 having an end cap 72 at one end thereof provided with a fluid inlet 73, leakage between the cap and the housing being prevented by suitable packing 74 in the cap. The other end portion of the housing 71 is formed with a flange 75 and is then diametrically reduced as at 76. Suitable tie bolts or rods 77 pass through the flange 75 and through the cap 72 along the outside of the housing 71 and serve to hold the cap in place.

The choke assembly designated generally by the numeral 78 consists of a cylindrical valve member 79 of resilient material having an axial fluid passage 80, the valve member in FIG. 6A being shown in the choked position and thus the passage 80 appears restricted. One end portion of the resilient valve member 79 is securely bonded to a fixed abutment member 81 which is fastened on a screw-threaded adapter 82 formed integrally with the cap 72. The abutment member 81 is provided with a central port 83 in register with the passage 80.

The other end portion of the valve member 79 is securely bonded to a tubular shell 84 which constitutes a component of and is screw-threadedly connected to a slidable abutment member or piston 85. The function of the shell 84 is to force the valve member 79 to choke the flow further upstream than in the valve embodiments 10 and 40. It has been found that pressure differential across the choke causes the resilient material of the valve member to "flow" toward the low pressure side or end where the choke is formed. It was also found that unless the fluid discharge from the choke is exactly coaxial with the valve housing, some degree of abrasion takes place against all elements of the valve downstream from the choke. However, by locating the valve member 79 further upstream by the shell 84 and placing a tubular liner 86 of wear resistant material within the shell immediately downstream from the choke, the piston 85 and the fluid transmitting tube 87 which is connected to the piston are protected against abrasion. Further protection of the tube 87 is afforded by providing the same with a thin-walled wear resistant liner 88. The liners 86 and 88 are made of suitable material having a high resistance to wear by abrasion, as for example, ceramic material, and the use of the two liners serves to control the jet issuing from the choke so as to protect the parts against abrasion damage.

Inasmuch as the inherent resiliency of the valve member 79 is relied upon to restore the same to its open position after choking, a metal sleeve 89 is inserted into the housing 71 in order to reduce friction between the housing and a portion 79' of the resilient valve member which surrounds the shell 84. The sleeve 80 is free to slide in the housing 71 with the axial movement of the choke assembly and serves to eliminate undue friction in that portion of the housing where compression of the valve member is unnecessary.

The portion of the housing 71 between the piston 85 and the housing portion 76 provides a pressure chamber 90, into which suitable fluid under pressure is admitted through a port 91 to react against the piston when the valve is to be choked. Suitable sealing means, such as C-cups 92, 93 are provided on the piston 85 to prevent leakage of fluid from the chamber 90 around the piston and also to prevent leakage of well fluid around the piston when well pressure exceeds the fluid pressure in the chamber 90.

The fluid transmitting tube 87 passes slidably through packing means 94 provided in the housing portion 76 and projects into a housing extension 95 which is connected to the housing portion 76 as by a screw-threaded coupling 96.

The extension 95 is equipped with a pair of diametrically opposed, removable bull plugs 97 in order to facilitate removal of the liner 86 without the necessity of placing a wrench on the tube 87. This is accomplished by removing the tie bolts 77 and sliding the liner and the tube 87 forwardly until diametrically opposite holes 98 formed in the end portion of the tube 87 are in alignment with openings 99 in which the plugs 97 are installed. With the plugs 97 removed, a suitable rod or bar 100 is inserted through the openings 99, 98 to secure the tube 87 against rotation relative to the housing extension 95, whereupon the liner may be easily unscrewed.

Figure 8:
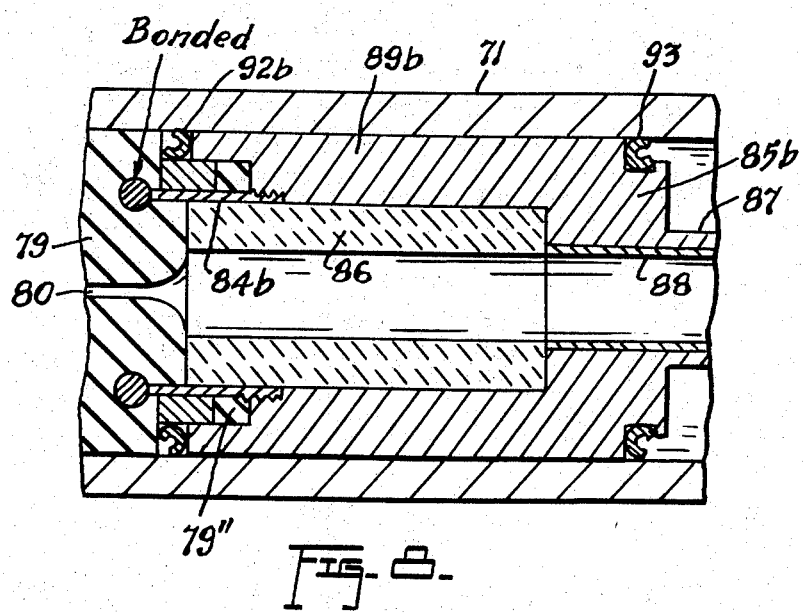
FIGURE 8 is a fragmentary longitudinal sectional view, similar to that in FIG. 7, but showing another modified embodiment.

FIGS. 7 and 8 illustrate slightly modified embodiments of the structure shown in FIG. 6A, such modifications dealing particularly with the liner 86 in relation to the aforementioned piston 85.

In FIG. 7, as compared to FIG. 6A, the piston 85a is provided with an integral, tubular extension 89a which takes the place of the aforementioned sleeve 89, the sealing cup 92a being positioned in this instance at the forward end of the piston extension 89a adjacent to the valve member 79. The portion 79' of the valve member 79 still extends into the space between the shell 84 and the piston extension 89a, but it is to be noted that inasmuch as the extension 89a is a part of the piston 85a, the liner 86 is disposed within the piston unit, as distinguished from its positioning between the piston and the valve member 79 in accordance with FIG. 6A.

In the further modified embodiment of FIG. 8, as compared to FIG. 7, the piston 85b is provided with a relatively thick tubular extension 89b and the shell 84b has been considerably shortened, so that for most of its length the liner 86 is contained within the piston extension 89b. The portion 79" of the valve member 79 is shortened accordingly, and the sealing cup 92b is provided at the forward end of the piston extension 89b in much the same manner as in the embodiment of FIG. 7. Here again, the liner 86 is disposed within the piston unit, rather than between the piston and the valve member 79 as in FIG. 6A.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a fluid throttling valve, the combination of an elongated housing adapted for passage of fluid longitudinally therethrough and having an inlet and an outlet end, a fixed abutment member mounted in fixed position at the inlet end portion of said housing and provided with a central port, a tubular valve member of resilient material positioned in the housing and having the inlet end thereof secured to said fixed abutment member, said valve member being provided with a central fluid passage in communication with said port of the fixed abutment member, a slidable abutment member at the outlet end of said valve member and provided with a central port in register with said fluid passage of the valve member, said resilient valve member being axially compressible and radially inwardly expansible whereby the cross-section of said fluid passage may be reduced as a function of axial thrust applied to said slidable abutment member in the direction of the fixed abutment member for compressing the resilient resilient valve member therethrough, and means for applying axial thrust to said slidable abutment member, together with a tubular liner of wear resistant material axially juxtaposed to said resilient valve member.

2. The device as defined in claim 1 wherein said tubular liner is positioned at the downstream end of said resilient valve member between the latter and said slidable abutment member.

3. The device as defined in claim 1 wherein said tubular liner is positioned at the downstream end of said resilient valve member, together with a tubular extension provided integrally on said slidable abutment member and projecting therefrom in the direction of said valve member, said tubular liner being contained within said extension of said slidable abutment member.

4. In a fluid throttling valve, the combination of an elongated housing adapted for passage of fluid longitudinally therethrough and having an inlet and an outlet end, a fixed abutment member mounted in fixed position at the inlet end portion of said housing and provided with a central port, a tubular valve member of resilient material positioned in the housing and having the inlet end thereof secured to said fixed abutment member, said valve member being provided with a central fluid passage in communication with said port of the fixed abutment member, a slidable abutment member at the outlet end of said valve member and provided with a central port in register with said fluid passage of the valve member, said resilient valve member being axially compressible and radially inwardly expansible whereby the cross-section of said fluid passage may be reduced as a function of axial thrust applied to said slidable abutment member in the direction of the fixed abutment member for compressing the resilient valve member therethrough, and means for applying axial thrust to said slidable abutment member, together with a fluid transmitting tube extending axially in said housing and connected at one end thereof to said slidable abutment member, and a tubular liner of wear resistant material provided between the downstream end of said resilient valve member and said slidable abutment member whereby to protect said tube against abrasion by fluid passing therethrough.

5. In a fluid throttling valve, the combination of an elongated housing having a fluid inlet and a fluid outlet at the opposite ends thereof, a tubular valve member of resilient material provided in the inlet end portion of said housing and formed with a central fluid passage, a slidable abutment member positioned in said housing downstream from said valve member and operatively connected to the latter whereby the valve member may be axially compressed and radially inwardly expanded to reduce the cross-section of said fluid passage as a function of axial thrust applied to said slidable abutment member in the direction of the valve member, means for applying axial thrust to said slidable abutment member, and a tubular liner of wear resistant material interposed between the valve member and the slidable abutment member.

6. The device as defined in claim 5 wherein said tubular liner is positioned at the downstream end of said resilient valve member, together with a tubular extension provided integrally on said slidable abutment member and projecting therefrom in the direction of said valve member, said tubular liner being contained within said extension of said slidable abutment member.

7. The device as defined in claim 5 together with a fluid transmitting tube extending axially in the outlet end portion of said housing and connected at one end thereof to said slidable abutment member, said liner protecting said tube against abrasion by fluid passing therethrough.

8. The device as defined in claim 5 wherein said liner is made of ceramic material.

9. The device as defined in claim 5 wherein said slidable abutment member includes a main body portion and a tubular shell projecting axially therefrom, said shell being securely bonded to the downstream end portion of said resilient valve member and said wear resistant liner being contained within said shell.

10. The device as defined in claim 9 together with a fixed abutment member provided in the inlet end portion of said housing and securely bonded to the upstream end portion of said resilient valve member.

11. A unitary choke assembly for fluid throttling valves, said assembly comprising a tubular valve member of resilient material formed with a central fluid passage capable of having its cross-section reduced by axial compression and inward radial expansion of said valve member, a first abutment member at one end of said valve member and formed with a central port in register with said fluid passage, and a second abutment member at the other end of said valve member, said second abutment member also being formed with a central port in register with said passage, one of said abutment members including a main body portion and a tubular shell portion projecting axially therefrom, said shell portion being bonded to said valve member, and a tubular liner of wear resistant material contained within said shell portion for protecting the port of the associated abutment member against abrasion by fluid passing therethrough.

References Cited

UNITED STATES PATENTS

| 2,319,498 | 5/1943 | Gerard | 138—45 X |
| 2,917,269 | 12/1959 | Welker | 251—62 |

FOREIGN PATENTS

| 1,140,385 | 3/1957 | France. |

LAVERNE D. GEIGER, *Primary Examiner.*

B. E. KILE, *Assistant Examiner.*